United States Patent
Taylor et al.

(10) Patent No.: US 9,811,276 B1
(45) Date of Patent: Nov. 7, 2017

(54) ARCHIVING MEMORY IN MEMORY CENTRIC ARCHITECTURE

(71) Applicant: EMC Corporation, Hopkinton, MA (US)

(72) Inventors: Kenneth J. Taylor, Franklin, MA (US); Randall Shain, Wrentham, MA (US); Adrian Michaud, Carlisle, MA (US); Stephen Wing-Kin Au, Norwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 89 days.

(21) Appl. No.: 14/863,885

(22) Filed: Sep. 24, 2015

(51) Int. Cl.
*G06F 12/00* (2006.01)
*G06F 13/00* (2006.01)
(Continued)

(52) U.S. Cl.
CPC ............ *G06F 3/0619* (2013.01); *G06F 3/065* (2013.01); *G06F 3/0655* (2013.01); *G06F 3/0685* (2013.01)

(58) Field of Classification Search
CPC .... G06F 3/0601; G06F 3/0614; G06F 3/0616; G06F 3/0617; G06F 3/0619; G06F 3/0629; G06F 3/0631; G06F 3/0632; G06F 3/0634; G06F 3/0635; G06F 3/0637; G06F 3/0638; G06F 3/064; G06F 3/0641; G06F 3/0643; G06F 3/0644; G06F 3/0646; G06F 3/0647; G06F 11/1402; G06F 11/1446; G06F 11/1448; G06F 11/1451; G06F 11/1453; G06F 11/1456; G06F 11/1458; G06F 11/1461; G06F 11/1464; G06F 11/1466; G06F 11/1469; G06F 11/1471; G06F 11/1658; G06F 11/2094; G06F 11/2097; G06F 11/2056; G06F 17/30; G06F 17/30067; G06F 3/0649; G06F 3/065; G06F 3/0652; G06F 3/0653; G06F 3/0655; G06F 3/0656; G06F 3/0658; G06F 3/0659; G06F 3/0661; G06F 3/0662; G06F 3/0664;
(Continued)

(56) References Cited

U.S. PATENT DOCUMENTS 5,524,230 A * 6/1996 Sakaue ................ G06F 3/0601
    711/103
5,537,585 A * 7/1996 Blickenstaff .......... G06F 3/0617
(Continued)

OTHER PUBLICATIONS

A Fast and Power-Efficient Memory-Centric Architecture for Affine Computation; Yin et al; IEEE Transactions on Circuits and Systems II: Express Briefs, col. 63, iss. 7; Jul. 2016; pp. 668-672 (5 pages).*
(Continued)

*Primary Examiner* — Daniel C Chappell
(74) *Attorney, Agent, or Firm* — Ryan, Mason & Lewis, LLP

(57) ABSTRACT

At least one memory region from a memory device of a host computing system is identified as containing data considered to be inactive. The host computing system is operatively coupled to a storage system external to the host computing system and configured to execute an application program. At least one memory region is stored as an archived memory region on a non-volatile storage device of the storage system in a memory format utilized on the host computing system.

20 Claims, 3 Drawing Sheets

(51) Int. Cl.
*G06F 13/28* (2006.01)
*G06F 3/06* (2006.01)

(58) Field of Classification Search
CPC ...... G06F 3/0665; G06F 3/0667; G06F 3/067;
G06F 3/0671; G06F 3/0673; G06F
3/0674; G06F 3/0676; G06F 3/0677;
G06F 3/0679; G06F 3/068; G06F 3/0682;
G06F 3/0683; G06F 3/0685; G06F
3/0686; G06F 3/0688; G06F 3/0689
See application file for complete search history.

(56) References Cited

U.S. PATENT DOCUMENTS

| | | | |
|---|---|---|---|
| 7,107,418 B2 * | 9/2006 | Ohran | G06F 11/1464 707/999.202 |
| 8,190,835 B1 * | 5/2012 | Yueh | G06F 3/0608 711/159 |
| 8,707,003 B1 * | 4/2014 | Mishra | G06F 3/0611 711/112 |
| 8,793,449 B1 * | 7/2014 | Kimmel | G06F 12/00 711/114 |
| 8,838,931 B1 * | 9/2014 | Marshak | G06F 3/0605 710/74 |
| 8,868,797 B1 * | 10/2014 | Kirac | G06F 3/061 710/15 |
| 8,874,835 B1 * | 10/2014 | Davis | G06F 3/0679 711/103 |
| 9,026,765 B1 * | 5/2015 | Marshak | G06F 3/061 711/114 |
| 9,213,485 B1 * | 12/2015 | Hayes | H04L 49/10 |
| 2005/0066095 A1 * | 3/2005 | Mullick | G06F 17/30171 710/200 |
| 2007/0168398 A1 * | 7/2007 | Miroshnichenko | G06F 17/30067 |
| 2007/0277011 A1 * | 11/2007 | Tanaka | G06F 3/0611 711/162 |
| 2011/0320690 A1 * | 12/2011 | Petersen | G06F 3/0611 711/103 |
| 2013/0246724 A1 * | 9/2013 | Furuya | G06F 3/0655 711/162 |
| 2016/0210082 A1 * | 7/2016 | Frank | G06F 3/0604 |
| 2016/0306554 A1 * | 10/2016 | Li | G06F 3/0604 |
| 2016/0306585 A1 * | 10/2016 | George | G06F 3/0619 |

OTHER PUBLICATIONS

Memory-centric architectures: why and perhaps what; Burger et al; Innovative Architecture for Future Generation High-Performance Processors and Systems; Oct. 24, 1997; p. 92 (1 page).*

* cited by examiner

ARCHIVING MEMORY IN MEMORY CENTRIC ARCHITECTURE

FIELD

The field relates generally to data storage systems employed in computing systems, and in particular, to techniques for managing memory in data storage systems.

BACKGROUND

A data storage system typically includes one or more host computing devices ("hosts") in communication with one or more data storage arrays. A host typically executes an application program (e.g., a database application) which requires data associated with the application to be stored locally on the host, remotely on one of the data storage arrays, or stored both locally and remotely. The host typically includes memory devices that provide both volatile random access memory capacity (e.g., dynamic random access memory (DRAM)) and non-volatile random access memory capacity (e.g., flash memory devices). The data storage array typically includes storage devices that provide non-volatile random access storage capacity (e.g., flash memory devices) and non-volatile large storage capacity (e.g., hard disk drives (HDDs) and tape drives). Random access memory is used to satisfy high throughput and/or bandwidth requirements of a given application program while the hard disk and tape drives are used to satisfy capacity requirements. It is desirable to develop improved techniques for managing memory in data storage systems such as, for example, data storage systems configured as described above.

SUMMARY

Embodiments of the invention comprise techniques for managing archived memory.

For example, one method comprises the following steps. At least one memory region from a memory device of a host computing system is identified as containing data considered to be inactive. The host computing system is operatively coupled to a storage system external to the host computing system and configured to execute an application program. At least one memory region is stored as an archived memory region on a non-volatile storage device of the storage system in a memory format utilized on the host computing system. Advantageously, the method is applicable to any systems that use memory as a main store, i.e., memory centric systems.

Other embodiments of the invention comprise, without limitation, computing systems and articles of manufacture comprising processor-readable storage media.

DETAILED DESCRIPTION

Figure 1:
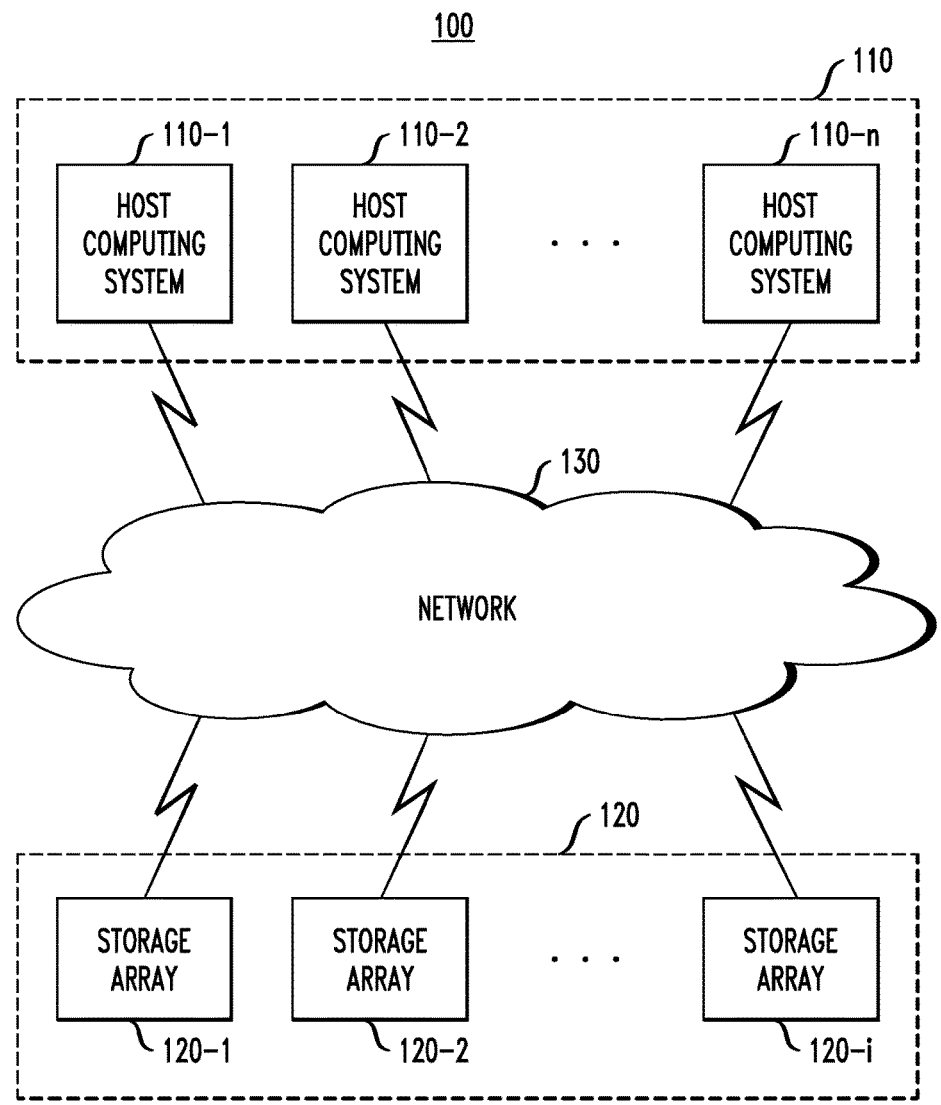
FIG. 1 is a high-level schematic illustration of a computing system which can be configured with an architecture that supports archived memory, in accordance with an embodiment of the invention.

Embodiments of the invention will be described herein with reference to systems and methods for managing archiving memory. Embodiments of the invention will be described with reference to illustrative computing systems, data storage systems, and associated servers, computers, memory devices, storage devices and other processing devices. It is to be appreciated, however, that embodiments of the invention are not restricted to use with the particular illustrative system and device configurations shown.

It is to be understood that the terms "computing system" and "data storage system" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure. For example, the term "computing system" as used herein is intended to be broadly construed, so as to encompass any system comprising multiple networked processing devices such as a data center or any private or public cloud computing system or enterprise network. Moreover, the term "data storage system" as used herein is intended to be broadly construed, so as to encompass, for example, any type of data storage system, or combination of data storage systems, including, but not limited to storage area network (SAN) systems, direct attached storage (DAS) systems, Hadoop Distributed File System (HDFS), as well as other types of data storage systems comprising clustered or distributed virtual and/or physical infrastructure.

The terms "application," "program," "application program," and "computer application program" herein refer to any type of software application, including desktop applications, server applications, database applications, and mobile applications. The terms "application process" and "process" refer to an instance of an application that is being executed within a computing environment.

The term "memory" herein refers to any type of computer memory accessed by an application using memory access programming semantics, including, by way of example, dynamic random-access memory (DRAM) and memory-mapped files. Typically, reads or writes to underlying devices are performed by an operating system (OS), not the application. As used herein, the term "storage" refers to any resource that is accessed by the application via input/output (I/O) device semantics, such as read and write system calls. In certain instances, the same physical hardware device is accessed by the application as either memory or as storage.

The term "metadata" as used herein is data that defines other data.

The phrase "memory region" as used herein is a named set of persisted memory pages.

Moreover, the term "tiering" as used herein with regard to memory or storage refers to the placement of information on storage infrastructure resource commensurate with implementation of a defined policy. Such policies can take a variety of factors into account including, but not limited to: information utilization usage statistics (e.g., I/O reads, writes, memory access); customer information values associated with levels of service (e.g., gold, silver, bronze, production, test, sandbox, archive); and any other custom tiering stratification criteria.

The term "page cache" as used herein (also referred to as a disk cache) is a cache of disk-based pages kept in main memory (e.g., DRAM) by the OS for faster access. The faster access may result from a relatively faster memory technology and/or from avoiding relatively slow data transfer over a network or legacy bus. A page cache is typically implemented within a kernel via paging memory management facilities and, thus, is generally transparent to applications. Data is transferred between main memory and disk in blocks of fixed size, called "pages." As will be appreciated, the more requested pages reside in cache, the better is the overall performance. A cache may maintain statistics on how frequently individual cache entries (e.g., pages) are accessed. If a given page is frequently accessed relative to another page in the cache, the given page may be migrated from one cache to another cache with less access latency. As another example, a cache may maintain statistics on how frequently cached pages are accessed and use such information to order pages in a cache according to frequency of access and evict pages that are less frequently accessed (e.g., least recently used (LRU) cache replacement policies).

Modern data management applications are being written to rely on primary data residency in memory, and soon primary data persistence in persistent memory (i.e., memory as a main store or memory centric data storage system). With that architectural shift, however, comes the problem of putting archived or long-term inactive data onto memory specifically designated as archival memory storage. It would be desirable for the user to designate certain memory as such because of its cost, performance, location, or power attributes. However, proper semantics need to be in place within the virtual memory management capabilities of the operating system to allow the application to designate a memory resource as archival memory storage and to have specific behaviors enforced that guarantee the safe and consistent storage of memory page data along with its associated metadata. The user also needs to be able to have an interface to traditional methods of safe remote transmission, retrieval and retention of data archives that can be used with persisted memory archives.

Applications deploying a memory centric architecture currently have no way of specifying that a specific memory region is to be treated as archived data. Virtual memory managers currently have no special understanding or treatment of archived memory to enable safe quiescing, archiving, transfer, and re-use. Further, applications have no way of transferring/saving/cataloging/retrieving archived memory locally or remotely, as they do with other data in their enterprise. Still further, applications have no way of transferring/saving/cataloging/retrieving archived memory along with associated metadata describing associated caching configuration, saved page temperature and general active-state QoS (quality of service) settings. Advantageously, embodiments of the invention overcome these and other current drawbacks associated with a memory centric architecture by providing these and other features.

While embodiments of the invention will be described herein in the context of an illustrative memory centric architecture (MCA), it is to be realized that embodiments of the invention are not limited to such an illustrative architecture. MCA is a framework configured to enable an application to create tiers of memory, and then to move data to different tiers based on quality-of-service (QoS) and return-on-investment (ROI) needs.

Illustrative embodiments thus provide for an archived memory tier, where data is relocated when the application deems it to be no longer in an active state. The archived memory tier is configured to enable enhanced functions such as re-platforming to lower cost data centers, regions and infrastructures, as well as enabling communications with storage replication systems. That is, illustrative embodiments allow a virtual memory management system to recognize and properly maintain archived memory regions, and provide an interface to third party data replication systems that can be used with the data from this archived memory.

As will be illustratively explained below in the context of the figures, once a memory region in the MCA is chosen for archiving due to inactivity or user direction, all the metadata associated with the memory region is included in the archive. This metadata can include, but is not limited to: memory/storage tier of origin description; memory region QoS settings; associated memory/storage caching hierarchy description; associated memory/storage caching policies and persisted page coloring; and application configuration and metadata. The abundance of metadata to be archived with the memory region allows for a re-instantiation on a new platform with a best-matched memory/storage tier and caching hierarchy configuration. The archival memory storage includes features for supporting this re-instantiation including, but are not limited to: fast bulk writes of region page data and associated metadata; checkpointing of page data and metadata to preserve consistency; fast bulk retrieval of region page data and associated metadata; random read with page addressability; page metadata query; and compatibility with third party replication systems for protection and/or migration.

FIG. 1 is a high-level schematic illustration of a computing system 100 which can be configured with a memory centric architecture that supports archived memory, in accordance with an embodiment of the invention. The computing system 100 comprises a plurality of application host computing devices 110-1, 110-2, . . . , 110-$n$ (collectively referred to as "application hosts" 110), which are operatively coupled to one or more of a plurality of data storage arrays 120-1, 120-2, . . . , 120-$i$ (collectively referred to as data storage arrays 120), over a network 130. The network 130 may comprise any known communication network such as, but not limited to, a WAN (wide area network), a LAN (local area network), a WLAN (wireless local area network), etc., or combination of networks, which implement networking protocols such as, but not limited to, Internet Protocol (IP), Ethernet, Internet Small Computer System Interface (iSCSI), Fibre Channel (FC), wireless protocols, RDMA (remote direct memory access), NVMe (NVM Express) or Non-Volatile Memory Host Controller Interface Specification (NVMHCI) (which is a specification for accessing solid-state drives (SSDs) attached through a PCI Express (PCIe) bus), or other related communication protocols, etc.

The application hosts 110 are configured to execute applications, such as database applications or other types of applications. In one embodiment, one or more of the application hosts 110 comprises a server (e.g., a Linux server) upon which one or more applications execute. In one embodiment, the application hosts 110 (and data storage arrays 120) are components of a data center which performs data computing and data storage functions to support one or more network applications and/or on-line services that are associated with private or public entities. For example, the computing system 100 of FIG. 1 may comprise a private or public business enterprise network that hosts and manages consumer or business applications, which are used by multiple, simultaneously connected local or remote users. Depending on the implementation of the computing system 100, the application hosts 110 are configured to, e.g., execute business logic, execute scripts and services to query databases, and perform other computing functions that are needed to host and deliver consumer or business applications and services to multiple end users, service providers, and/or organizations.

Moreover, the data storage arrays 120 can be implemented using various types of persistent (non-volatile) storage elements and data storage system architectures. For instance, in one embodiment of the invention, one or more of the data storage arrays 120 may be configured as a SAN system, a DAS system, an HDFS system, as well as other types of data storage systems comprising clustered or distributed virtual and/or physical architectures. The data storage arrays 120 include one or more different types of persistent storage devices such as HDDs (hard disk drives), flash storage devices, disk storage devices, SSD (solid-state drive) devices, or other types and combinations of non-volatile memory. In one embodiment, the data storage arrays 120 comprise one or more storage products such as, by way of example, VNX® and Symmetrix VMAX®, both commercially available from EMC Corporation of Hopkinton, Mass. The EMC Symmetrix VMAX® systems are enterprise-class storage platforms comprising high performance, scalable storage arrays, which can be implemented for hyper-scale computing systems. A variety of other storage products may be utilized to implement at least some of the data storage arrays 120.

In general, the application hosts 110 execute applications using local memory resources and issue read and write requests ("commands") to one or more of the data storage arrays 120. The data storage arrays 120 are configured with storage resources that are used to store backend data files. The data storage arrays 120 process read and write commands received from the application hosts 110 and, in the case of read requests, send data stored thereon back to the requesting one of the application hosts 110. In one embodiment, the computing system 100 provides a memory and storage tier architecture, which comprises one or more tiers resident on the application hosts 110 and one or more tiers resident on the data storage arrays 120. In one embodiment, the applications executing on the application hosts 110 determine (either automatically or in response to user input) which of the various tiers to store data associated with an executing application.

In another embodiment, the computing system 100 may comprise a plurality of virtual machines (VMs) that are implemented using a hypervisor, and which execute on one or more of application hosts 110 or data storage arrays 120. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices. An example of a commercially available hypervisor platform that may be used to implement portions of the computing system 100 in one or more embodiments of the invention is the VMware® vSphere® which may have an associated virtual infrastructure management system such as the VMware® vCenter™. The underlying physical infrastructure may comprise one or more distributed processing platforms that include storage products such as the above noted VNX® and Symmetrix VMAX® products.

In one embodiment of the invention, the computing system 100 of FIG. 1 implements a memory centric architecture (MCA) which provides applications executing on the application hosts 110 with additional virtual memory through a memory extension framework in which a plurality of MCA library functions are provided to efficiently manage multiple user virtual address spaces comprised of combinations of volatile memory, high throughput low latency next generation non-volatile memory technologies, NAND flash technologies connected to a host in various ways (e.g., PCI-e, SAS/SATA), host-connected disk technology, and various forms of SAN connected storage including both server SANs and traditional storage SANs. MCA provides an alternative "kernel-based" virtual memory manager architecture that is configured to overcome the current limitations and non-deterministic behavior provided by conventional virtual memory manager frameworks, such as the Linux virtual memory manager.

In particular, while most operating systems implement virtual memory, applications cannot address the physical memory directly. Instead, the operating system translates between the application's virtual address space and the system's physical address space. In this approach, every program has its own private address space and thus can run independently from other programs on the system. In such a system, the memory is organized in pages (typically 4 KB in size), and the translation between virtual and physical address space is performed using a page table. An MCA framework as described herein provides an interface for creating server class memory (SCM) tiers that extend memory and for accessing and caching SCM tiers by means of virtual memory, with enhanced memory performance, deterministic access latencies, and effective control over virtual memory.

For example, rather than allocating physical pages from a single system wide page cache as in conventional systems, an MCA framework provides a facility to pre-allocate one or more system wide fixed-size page caches. Applications control which page cache to use, which results in a more predictable execution time per process because the OS does not manage a single system wide page cache between competing processes. MCA supports pluggable memory-mapping (mmap) and page cache management policies, which control page cache replacement policies, etc. For example, two policies for deciding which pages to evict from a cache are supported: a first-in, first-out (FIFO) policy, and a least recently used (LRU) policy.

In addition, an application can tune the caching behavior by setting a low water level and an eviction size. The management of each page cache maintains the availability of free physical pages via these settings, e.g., the low water level specifies a threshold for the free memory in a page cache (below which an eviction is triggered), and the eviction size determines the number of pages evicted in such an event. This eviction strategy attempts to ensure page slot availability upon a page fault. Moreover, MCA enables bypassing of a virtual file system of a native OS and directly accessing a storage device driver, which when combined with a compatible storage device, further reduces the page fault latency.

Moreover, in accordance with embodiments of the invention, MCA supports coloring of individual pages to maximize page cache residency times and minimize the number of page faults. For example, a page color (alternatively referred to as page temperature) can be represented as a 16-bit integer, where higher values mean the page is accessed more frequently and should be kept in the page cache when possible. Individual pages may also be pinned based on importance to maintain cache residency. An application is responsible for assigning page colors to pages based on the access pattern or access heuristics of the pages. Moreover, in addition to the explicit specification by the applications, a page cache manager module of the MCA system can be configured to track the access to pages and dynamically adjust page colors based on those statistics.

Furthermore, MCA employs a technique called read ahead, where it preloads a number of subsequent pages starting from the faulting page. Accesses to these pages then only cause minor instead of major page faults and thus have lower latencies. MCA tries to automatically adapt the number of read ahead pages to the applications access patterns. These features promise better performance and control for accessing secondary storage in an in-memory database. This in turn may form the basis of an effective memory tier containing colder data, where the classification of data (e.g., hot and cold) by the database is mapped onto page colors. The underlying MCA library can use this information as a hint for which data should be kept in memory and thus reduce the number of page faults.

Figure 2:
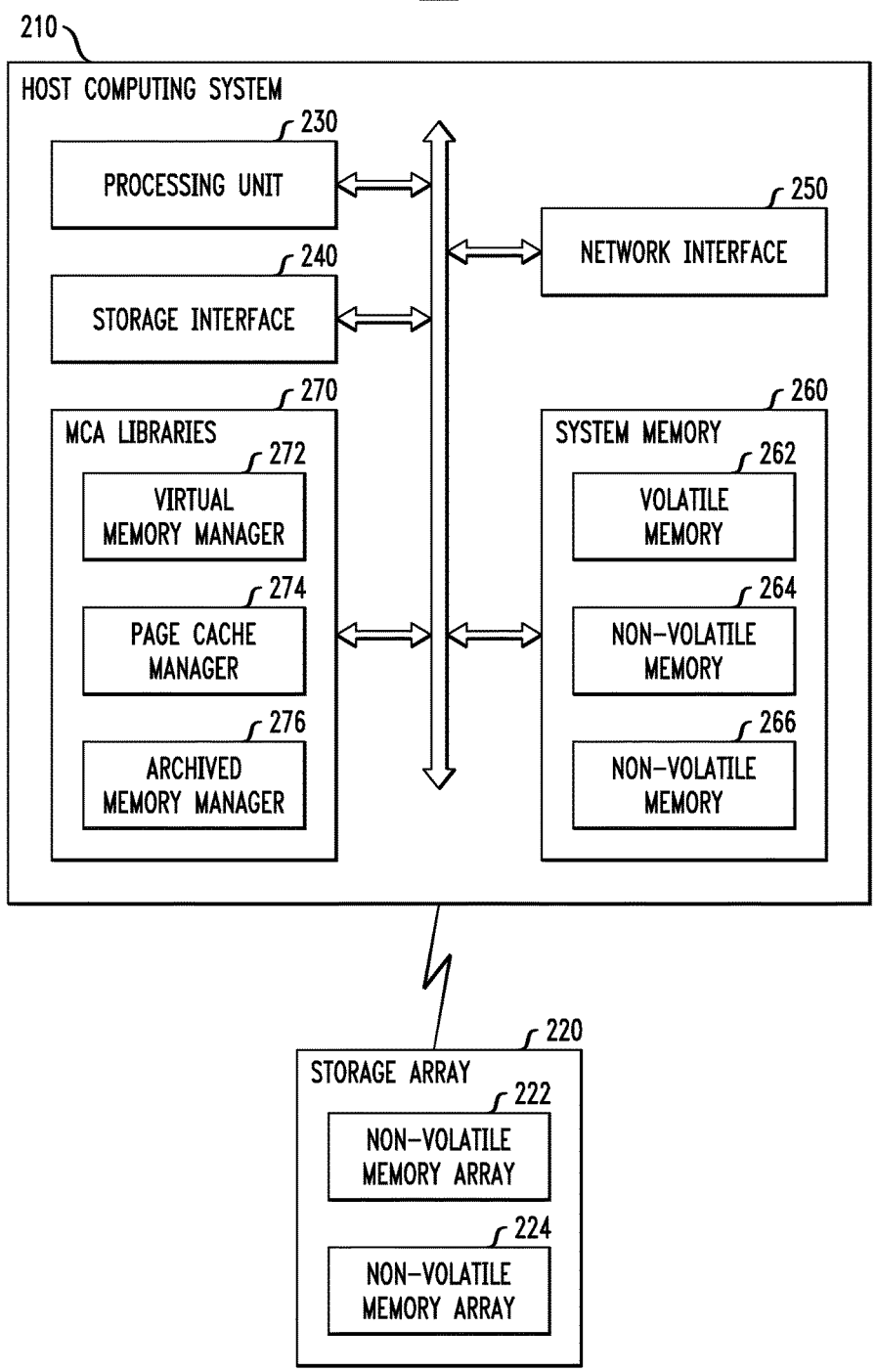
FIG. 2 schematically illustrates an embodiment of the computing system of FIG. 1 showing details of a host computing system and data storage array which implement an architecture that supports archived memory in accordance with an embodiment of the invention.

FIG. 2 schematically illustrates an embodiment of the computing system 100 of FIG. 1 showing details of a host computing system and data storage array to implement a memory centric architecture that supports archived memory in accordance with an embodiment of the invention. More specifically, FIG. 2 shows a computing system 200 comprising a host computing system 210 and a data storage array 220. The host computing system 210 comprises a processing unit 230, storage interface circuitry 240, network interface circuitry 250, system memory 260, and MCA libraries (library functions) 270. The system memory 260 comprises volatile memory 262 and various levels of non-volatile memory 264 and 266. The MCA libraries 270 provide functions for implementing a memory centric architecture, wherein the functions comprise a virtual memory manager module 272, a page cache manager module 274, and an archived memory manager module 276. It is to be understood that in one embodiment of the invention, the MCA library functions 270 may be implemented as software functions that are stored in the system memory 260 and executed by the processing unit 230. In other embodiments, the MCA library functions 270 may be implemented using a combination of dedicated hardware and firmware, in addition to software.

The processing unit 230 comprises one or more of a computer processor, a microprocessor, a microcontroller, an application-specific integrated circuit (ASIC), a field programmable gate array (FPGA) or other types of processing circuitry, as well as portions or combinations of such processing circuitry. Indeed, the processing unit 230 may comprises one or more "hardware processors" wherein a hardware process is intended to be broadly construed, so as to encompass all types of processors including, for example (i) general purpose processors and (ii) optimized processors, which comprise any possible combination of multiple "throughput cores" and/or multiple hardware-based accelerators. Examples of optimized processors include, for example, graphics processing units (GPUs), digital signal processors (DSPs), system-on-chip (SoC), ASICs, FPGAs, and other types of specialized processors or coprocessors that are configured to execute one or more fixed functions.

The storage interface circuitry 240 enables the processing unit 230 to interface and communicate with the system memory 260 and the non-volatile memory arrays 222 and 224 using one or more standard communication and/or storage control protocols to read, write and otherwise access data in persistent storage devices such as flash memory devices, DAS devices, SAN storage devices, etc., depending on the storage system(s) that are implemented. The network interface circuitry 250 enables the host computing system 210 to interface and communicate with a network and other system components. The network interface circuitry 250 may comprise conventional transceivers of a type well known in the art (e.g., network interface cards, I/O adaptors, etc.).

The system memory 260 comprises electronic memory such as random access memory (RAM), read-only memory (ROM), or other types of memory, in any combination. The system memory 260 stores one more software programs having instructions that are read and processed by the processing unit 230 to run a native operating system (OS) and one or more applications that run on the host computing system 210. The system memory 260 and other persistent storage elements described herein having program code tangibly embodied thereon are examples of what is more generally referred to herein as "processor-readable storage media" that store executable program code of one or more software programs. Other examples of processor-readable storage media embodying program code include, for example, optical or magnetic storage disks. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

In accordance with embodiments of the invention, a data storage system comprising the system memory 260 and the data storage array 220 is configured to provide a memory and storage tier architecture, comprising multiple, independent memory/storage tiers. For example, the system memory 260 of the host computing system 210 can provide a hierarchical memory tier structure wherein the volatile memory 262 (highest level in a memory tier) may comprise a dynamic random-access memory tier (e.g., DRAM) or other forms of volatile random-access memory. The non-volatile system memory 264 may comprise a server-class memory (SCM) tier that is accessible as a memory resource. The non-volatile system memory 264 may comprise one or more SCM devices including, for example, NAND flash and next generation non-volatile memory (NGNVM) devices. The non-volatile system memory 266 may comprise an SCM tier that is accessible as an I/O resource.

Moreover, the storage tiers resident on the data storage array 220 include an SCM tier (e.g., non-volatile memory array 222) that is accessible as an I/O resource. For example, the non-volatile memory array 222 may comprise a top of rack flash memory array. Moreover, in one embodiment of the invention, the non-volatile memory array 224 may comprise a network storage tier (e.g., SAN (storage area network)). The data storage array 220 may be implemented using other storage tiers such as a serial attached storage (SAS/SATA) tier, for example. Applications running on the host computing system 210 can make data placement selections end-to-end, e.g., across the different memory/storage tiering layers, or within a given memory/storage tiering layer.

As noted above, the MCA libraries 270 provide functions for implementing a memory centric architecture comprising a hierarchical memory/storage tiering framework, for example, as described herein. The MCA libraries 270 comprise functions that are executable in a "user space" of a native OS (as opposed to a privileged "kernel space" of the OS) to manage virtual memory and to manage multiple independent page caches, each utilizing unique portions of different tiers of available SCM technologies in order to provide the most control of application quality of service (QoS). The pages managed in page caches originate from MCA-defined memory-mapped regions of non-volatile data stores that are included in one or more of the non-volatile memories (e.g., 266, 222, and 224). The memory-mapped regions of the non-volatile data stores provide the ability to persistently maintain page-specific metadata along with the page data itself.

The virtual memory manager module 272 is utilized by an application executing on the host computing system 210 to map a private virtual address space of the application to one or more defined memory-mapped regions of non-volatile data stores, which are resident on one or more of the non-volatile memories (e.g., 266, 222, and 224). This framework enables persistence of page caches associated with one or more executing applications in the event of a reboot of the applications or the host computing system 210. Since DRAM is volatile, meaning that any data that is placed into it is lost upon power failure or other restart events, the repopulation of the application cache is a major operation concern for all application vendors that rely on large DRAM-based caches. However, embodiments of the invention as discussed herein are configured to provide non-volatile caches. For example, since an SCM is a non-volatile resource, the SCM can be used to construct and utilize memory-mapped files to be consumed as an application cache resource, thereby enabling the host computing system 210 to support non-volatile application caches that do not require expensive repopulation after a reboot or unexpected outage of the host computing system 210.

More specifically, in accordance with embodiments of the invention, the virtual memory manager module 272 is configured to manage virtual memory having page caches that can be maintained in the volatile memory 262 of the system memory 260 during run-time execution of an application, and which can also be maintained in memory-mapped regions of one or more non-volatile data stores of the tiered memory/storage architecture. A plurality of page caches can be provided in physical memory where each page cache can be shared with multiple memory-mapped regions in tiered memory. An application executing in the user space of the host computing system 210 can utilize the virtual memory manager module 272 library function to create one or more memory-mappings for one or more regions in the tiered memory and associate each memory-mapping with one or more page caches. In one embodiment, the page caches are dynamically configurable in size.

In a data storage environment as shown in FIG. 2 comprising a combination of memory tiering and storage tiering, the memory tiers are constructed by memory mapping a region of an SCM device or a region of an array storage device into the virtual address spaces of applications. In one embodiment, each memory mapped region in tiered memory is fronted by a DRAM page cache to which an application issues loads and stores. The virtual memory manager 272 function can be utilized by an application to move data between an SCM or array device and the DRAM page cache on an on-demand page basis.

The page cache manager module 274 actively tracks the usage of each page in a given page cache, and as the access frequency of a given page increases, its perceived importance, reflected by its page color, also increases. The page cache manager 274 and/or the applications executing on the host computing system 210 can track and collect page access patterns and assign a "page color" to a given page based on, e.g., the frequency of access of the page by the application. This persistence of the page color information during runtime provides the ability to restore the associated collection of pages to the most advantageous locations within the cache hierarchy, thereby allowing an application to quickly return to the state of performance previously exhibited based on the persisted page color information.

The archived memory manager module 276 is configured to manage the creation, storage, and subsequent usage of archived memory regions within the MCA framework. As will be illustratively described below in the context of FIG. 3, the archived memory manager module 276 manages, inter alia, fast bulk writes of region page data and associated metadata, checkpointing of page data and metadata to preserve consistency, fast bulk retrieval of region page data and associated metadata, random read with page addressability, page metadata query, interfacing with third party replication systems for protection and/or migration, as well as various other functions described herein.

It is to be appreciated that the functionalities of one or more of the MCA library manager modules (272, 274, and 276) can be combined into a single manager module. By way of example only, the archived memory manager functionalities can be implemented as part of the virtual memory manager 272.

Figure 3:
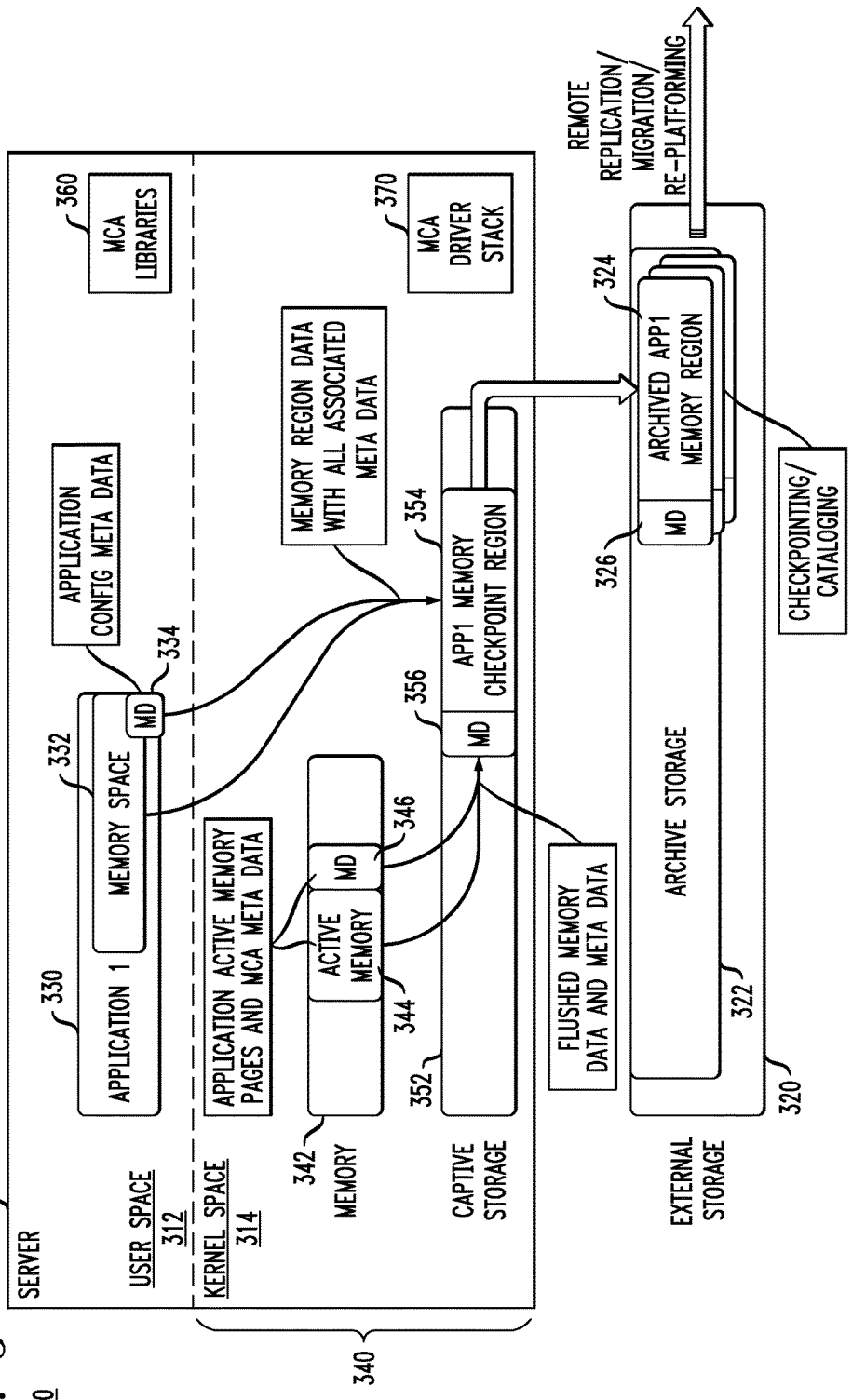
FIG. 3 schematically illustrates a method which is implemented by a computing system to provide management of archived memory, and a state of a host computing system and data storage array during run-time execution of an application, in accordance with an embodiment of the invention.

FIG. 3 schematically illustrates a method which is implemented by a computing system 300 to provide creation and management of archived memory in accordance with an embodiment of the invention. The computing system 300 comprises an application host 310 and a data storage array 320 (alternatively referred to herein as "off-host infrastructure" or "external storage" 320). The application host 310 comprises an operating system (OS) in which at least one application (app1) 330 and MCA libraries 360 execute in a user space 312, and wherein a system memory 340 and associated MCA memory drivers 370 operate in a privileged kernel space 314 of the OS. In one embodiment of the invention, the application host 310 comprises a computing server such as a database server, file server, mail server, web server, application server, etc.

The system memory 340 comprises a memory tier structure comprising multiple levels of system memory including a volatile memory 342 and a non-volatile memory 352. The system memory 340 can have more volatile and/or non-volatile levels than those illustratively depicted in FIG. 3. The external storage (off-host infrastructure) 320 comprises a storage tier structure comprising a non-volatile memory array (not expressly shown but which can be a flash memory array, e.g., top of rack flash memory array) and a SAN storage array which includes archive storage 322.

In one embodiment of the invention, the volatile memory 342 comprises a volatile DRAM (Dynamic Random Access Memory) module (e.g., a DIMM (Dual In-line Memory Module)). In addition, the non-volatile memory 352 can be implemented with any suitable NGNVM (next generation non-volatile memory) DIMM, or any suitable NGNVM AIC (add in card) module.

In accordance with illustrative embodiments, application 330 has memory space 332 allocated within the user space 312 for use in performing operations associated with the run-time execution of application 330. As such, application data is maintained in memory space 332. Application configuration metadata 334 is also maintained in memory space 332. Application configuration metadata 334 can include data specifying run-time and other parameters associated with application 330, as well as any other data that describes how application 330 is currently configured. In addition, active page data 344 (which is part of a page cache) is maintained in the volatile memory 342 along with metadata 346 during and after run-time execution of application 330 hosted by the host OS. In particular, FIG. 3 schematically illustrates a state of the application host 310 and the external storage 320 during and after run-time execution of application 330 executing in the user space 312 of the host OS. It is to be understood that, in general, application 330 has an associated private virtual address space which comprises a memory mapping which maps a region within one or more of non-volatile memory data stores into the private virtual address space the application.

It is assumed that application 330 (or a user thereof) has designated some active memory region as being inactive and thus wishes data associated with that memory region to be stored as archived or long-term inactive data in memory specifically designated as archival memory storage. Such designation by the application (or user) can be made through the archived memory manager 276 (FIG. 2) or some other function that is part of MCA libraries 360. More particularly, illustrative embodiments implement an archive semantic through an application programming interface (API) and/or command line interface (CLI) whereby the application/user can designate a memory region as archived/not archived.

Thus, as further illustrated in FIG. 3, it is assumed that the active memory region associated with active page data 344 is designated as a memory region to be archived. Thus, as shown, data including application page data 344 along with metadata 346, and application data stored in memory space 332 along with application configuration metadata 334, are stored in non-volatile memory denoted as captive storage 352. More particularly, the page data is stored as application (app1) memory checkpoint region 354, and the metadata is stored as metadata 356. Then, as shown, application (app1) memory checkpoint region 354 and metadata 356 is stored in data storage array 320 (archive storage portion of external storage) as archived application (app1) memory region 324 and metadata 326.

Advantageously, the data stored in archived application (app1) memory region 324 is stored along with all corresponding metadata 326 on a storage array of external storage 320 in the memory format (e.g., memory mapped, etc.) utilized on application host 310, allowing for efficient subsequent operations such as replication, migration, and re-platforming of the archived data.

It is to be appreciated that while the example in FIG. 3 shows the memory region to be archived being designated as a memory region from a volatile memory device (i.e., 324), alternative embodiments contemplate the memory region to be archived being designated as a memory region from a non-volatile memory device.

It is also to be appreciated that the archived memory region is first flushed of dirty pages and then enabled for copy-on-write (COW) to preserve a consistent image until the archival process completes. It is to be appreciated that a "dirty page" in this context means data page that is modified within cache but not modified in main memory. Upon completion, the updated COW pages will be synced back to the region and COW is disabled to return to normal memory region treatment.

Furthermore, the archived memory region can be taken 'offline,' and the page cache destroyed when safely replicated. In a true archival scenario (as compared to a backup scenario), the data should no longer be available to the application in its former location after archival completion. This is so that the archival process provides the most re-use of resources. One of the methods that can be used to enforce this condition is as follows. Assume the intent of the user is to switch the data in this region into an archived state, and that region has been successfully replicated to another location, including any COW pages that may have been in-flight during the copy. The system thus has the meta-data about the archived region data if it needs to be restored. Then, the system can temporarily make this region unavailable and initialize it. If there is a specific page cache that the user would like to have recycled, that is used exclusively with this region, the system can do that as well. After that, the user has a fresh region to be reused for active data. Alternatively, the system only needs to notify the user that the archival is complete, and those resources can be reused as desired. One likely usage scenario is where this data is being restored to completely different server(s) that may be dedicated to running the application looking at old, previously archived memory.

Accordingly, as shown in FIG. 3, a copy of the memory region, along with its configuration metadata 334 and cache metadata 346, are saved to supportable memory archival storage device (as part of archive storage 322) for third party transfer if required/desired. On memory archival storage, metadata and Simple Network Management Protocol (SNMP) event traps (or other event processing software) are exposed to third parties (some external data processing software or system such as, but not limited to, RecoverPoint which is commercially available from EMC Corporation of Hopkinton, Mass.) to indicate that a memory region is available for remote copy. If an archived region is made non-archived, metadata and SNMP event traps are likewise generated. The third party can check that there were no events that compromised the integrity of the archived copy during the copy window.

It is also to be appreciated that import of a destination device to a memory region most often will be required unless all memory regions for a device are being archived. Some destination devices may not be the desired memory region devices.

Furthermore, it could be possible for application 330 to delete the original memory region after successful archival. This would be a decision that application 330 would make.

Metadata for the source region being archived includes information about its associated archive region (e.g., storage location, available services (checkpointing, snaps, dedupe, replication, etc.), and scope (local, rack, SAN, WAN, etc.)). Scope helps in determining an immediate portability environment. For example, if it indicates "rack" scope, the application could be re-instantiated on another compute element in the rack immediately following an archive update without an archive region movement to a tier in that scope (or over-the-wire movement to a similar tier in a destination environment).

Metadata for the archived region includes information about its associated source region which could help re-instantiate the original source region environment on a new platform (e.g., caching, region name, storage tier).

If archive region metadata indicates that checkpointing is available, MCA APIs can expose it and/or interface with it so it is possible to retain/leverage archive history. Also, MCA checkpointing can be made to coordinate with external checkpointing to assure archive region checkpoint consistency. As is known, checkpointing/cataloging is a technique to add fault tolerance into computing systems by saving a snapshot of an application's state so that, for example, the application can restart from that point in case of failure.

Advantageously, illustrative embodiments provide archived memory that allows for enhanced functions such as re-platforming to lower cost data centers, regions and infrastructures, as well as communication with third party software that handles functions such as replication, migration, and re-platforming. Such communication can be managed through the archived memory manager module 276 (FIG. 2) or through one or more other interfaces.

In accordance with illustrative embodiments, applications deploying a memory centric architecture have a mechanism and methodology to specify that a specific memory region is for archived data, enabling for copying memory content from an active memory region to an archived memory region.

Furthermore, in accordance with illustrative embodiments, the virtual memory management of an MCA system is able to implement special handling of archived memory. This special handling includes, but is not limited to, page flush and quiesce, inclusion of configuration and cache metadata, flipping back-end memory store to read-only, interfaces to software that will issue SNMP, and reversing these processes.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for managing memory, comprising:
    identifying at least one memory region from a memory device of a host computing system as containing data considered to be inactive, wherein the host computing system is operatively coupled to a storage system external to the host computing system, wherein the host computing system executes an application program, and wherein the host computing system implements a virtual memory management system;
    storing the at least one memory region as an archived memory region on a non-volatile storage device of the storage system in a memory format utilized on the host computing system; and
    storing metadata associated with the at least one memory region on the non-volatile storage device;
    wherein the archived memory region is part of an archived memory tier within the virtual memory management system and is accessible by at least one system external to the storage system in the memory format utilized on the host computing system using at least a portion of the stored metadata;
    wherein the memory format utilized on the host computing system comprises a virtual memory having at least one page cache, the at least one page cache being maintained in the memory device of the host computing system in association with execution of the application program, at least a portion of the at least one page cache being memory-mapped to a virtual address space of the application program, the at least one memory region comprising at least a portion of the at least one page cache that is memory-mapped to the virtual address space of the application program;
    wherein storing the at least one memory region as the archived memory region on the non-volatile storage device comprises storing page data of the application program associated with run-time execution of the application program;
    wherein storing the metadata comprises storing page-specific metadata associated with the page data of the application program; and
    wherein the steps of the method are performed by at least one processing device comprising a processor operatively coupled to a memory.

2. The method of claim 1, wherein the metadata comprises metadata associated with a configuration of the application program.

3. The method of claim 1, wherein the metadata comprises metadata associated with a page cache in which the data considered to be inactive is stored.

4. The method of claim 1, wherein the step of identifying the at least one memory region is performed by the application program or a user of the application program.

5. The method of claim 1, further comprising flushing the at least one memory region of inconsistent data prior to the step of storing the at least one memory region as an archived memory region.

6. The method of claim 5, further comprising enabling a copy-on-write process to preserve a consistent image of the data in the at least one memory region throughout the step of storing the at least one memory region as an archived memory region.

7. The method of claim 1, further comprising enabling the archived memory region stored on the non-volatile storage device of the storage system to be accessed by the at least one system external to the storage system.

8. The method of claim 1, wherein the at least one system external to the storage system comprises at least one of a data replication system, a data migration system, a data checkpointing system, a data deduplication system, and a data re-platforming system.

9. The method of claim 1, wherein the host computing system implements a memory centric architecture associated with one or more library functions configured to manage multiple virtual address spaces.

10. The method of claim 9, wherein the one or more library functions comprise one or more of a virtual memory manager module, a page cache manager module and an archived memory manager module.

11. An article of manufacture comprising a processor-readable storage medium having stored therein program code of one or more software programs, wherein the program code is executable by one or more processors to:
    identify at least one memory region from a memory device of a host computing system as containing data considered to be inactive, wherein the host computing system is operatively coupled to a storage system external to the host computing system, wherein the host computing system executes an application program, and wherein the host computing system implements a virtual memory management system;
store the at least one memory region as an archived memory region on a non-volatile storage device of the storage system in a memory format utilized on the host computing system; and
store metadata associated with the at least one memory region on the non-volatile storage device;
wherein the archived memory region is part of an archived memory tier within the virtual memory management system and is accessible by at least one system external to the storage system in the memory format utilized on the host computing system using at least a portion of the stored metadata;
wherein the memory format utilized on the host computing system comprises a virtual memory having at least one page cache, the at least one page cache being maintained in the memory device of the host computing system in association with execution of the application program, at least a portion of the at least one page cache being memory-mapped to a virtual address space of the application program, the at least one memory region comprising at least a portion of the at least one page cache that is memory-mapped to the virtual address space of the application program;
wherein storing the at least one memory region as the archived memory region on the non-volatile storage device comprises storing page data of the application program associated with run-time execution of the application program; and
wherein storing the metadata comprises storing page-specific metadata associated with the page data of the application program.

12. The article of claim 11, wherein the metadata comprises metadata associated with a configuration of the application program.

13. The article of claim 11, wherein the metadata comprises metadata associated with a page cache in which the data considered to be inactive is stored.

14. The article of claim 11, wherein the identification of the at least one memory region is performed by the application program or a user of the application program.

15. The article of claim 11, further comprising program code executable by the one or more processors to flush the at least one memory region of inconsistent data prior to the storage of the at least one memory region as an archived memory region.

16. The article of claim 15, further comprising program code executable by the one or more processors to enable a copy-on-write process to preserve a consistent image of the data in the at least one memory region throughout the storage of the at least one memory region as an archived memory region.

17. The article of claim 11, further comprising program code executable by the one or more processors to enable the archived memory region stored on the non-volatile storage device of the storage system to be accessed by the at least one system external to the storage system.

18. The article of claim 11, wherein the at least one system external to the storage system comprises at least one of a data replication system, a data migration system, a data checkpointing system, a data deduplication system, and a data re-platforming system.

19. A system, comprising:
a host computing system configured to execute an application program and implement a virtual memory management system;
a storage system external to the host computing system, wherein the host computing system is operatively coupled to the storage system; and
one or more processors operatively coupled to a memory and associated with the host computing device, wherein the one or more processors:
identify at least one memory region from a memory device of the host computing system as containing data considered to be inactive;
cause the at least one memory region to be stored as an archived memory region on a non-volatile storage device of the storage system in a memory format utilized on the host computing system; and
cause metadata associated with the at least one memory region to be stored on the non-volatile storage device;
wherein the archived memory region is part of an archived memory tier within the virtual memory management system and is accessible by at least one system external to the storage system in the memory format utilized on the host computing system using at least a portion of the stored metadata;
wherein the memory format utilized on the host computing system comprises a virtual memory having at least one page cache, the at least one page cache being maintained in the memory device of the host computing system in association with execution of the application program, at least a portion of the at least one page cache being memory-mapped to a virtual address space of the application program, the at least one memory region comprising at least a portion of the at least one page cache that is memory-mapped to the virtual address space of the application program;
wherein storing the at least one memory region as the archived memory region on the non-volatile storage device comprises storing page data of the application program associated with run-time execution of the application program; and
wherein storing the metadata comprises storing page-specific metadata associated with the page data of the application program.

20. The system of claim 19, wherein the metadata comprises at least one of metadata associated with a configuration of the application program and metadata associated with a page cache in which the data considered to be inactive is stored.

* * * * *